US011348144B2

(12) United States Patent
Unnikrishnan et al.

(10) Patent No.: US 11,348,144 B2
(45) Date of Patent: May 31, 2022

(54) SHOPPABLE ADS WITH QUERY RELEVANT OFFERS

(71) Applicant: Google LLC, Mountain View, CA (US)

(72) Inventors: Umesh Unnikrishnan, San Francisco, CA (US); Ramachandran Ramaswamy, Sunnyvale, CA (US); Phuoc Jeremy Lenguyen, Burlingame, CA (US); Jason Gouliard, Half Moon Bay, CA (US); Lilu Xu, Sunnyvale, CA (US); Shi-Ting Zhou, Pittsburg, CA (US); Shishi Fu, Santa Clara, CA (US); Francois Toit Spies, Half Moon Bay, CA (US); Xi Liu, Mountain View, CA (US); Amit Chandak, Milpitas, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/510,361

(22) Filed: Jul. 12, 2019

(65) Prior Publication Data
US 2021/0012391 A1    Jan. 14, 2021

(51) Int. Cl.
*G06Q 30/00* (2012.01)
*G06Q 30/02* (2012.01)
*G06N 20/00* (2019.01)
*G06Q 30/06* (2012.01)

(52) U.S. Cl.
CPC ......... *G06Q 30/0277* (2013.01); *G06N 20/00* (2019.01); *G06Q 30/0271* (2013.01); *G06Q 30/0643* (2013.01)

(58) Field of Classification Search
CPC ........... G06Q 30/0277; G06Q 30/0271; G06Q 30/0643; G06N 20/00
See application file for complete search history.

(56) References Cited

U.S. PATENT DOCUMENTS

| 2010/0114615 | A1* | 5/2010 | Ganguly | G06F 16/24578 |
| | | | | 705/5 |
| 2011/0004525 | A2* | 1/2011 | Byrne | G06Q 40/00 |
| | | | | 705/14.67 |
| 2015/0317714 | A1* | 11/2015 | Huet | G06Q 10/067 |
| | | | | 705/26.62 |

(Continued)

OTHER PUBLICATIONS

Chatterjee, Surojit, "Connecting you to visual shoppers with new ad formats on Google Images," published Mar. 5, 2019, pp. 1-5.

(Continued)

*Primary Examiner* — Alvin L Brown
(74) *Attorney, Agent, or Firm* — Leason Ellis LLP

(57) ABSTRACT

A computer implemented method for displaying shoppable advertisements based on search query including receiving the search query from a user; retrieving an image comprising plurality of purchasable products related to the search query from a database; calculating a product relevance score for each of the plurality of products within each image based the search query; ranking each of the plurality products based on the product relevance score; selecting a subset of products based on the ranking; displaying the image comprising the plurality of products; and displaying the shoppable advertisements for the selected subset of products on a user device.

24 Claims, 14 Drawing Sheets

(56) References Cited

U.S. PATENT DOCUMENTS

2016/0328752 A1* 11/2016 Andrianakou ..... G06Q 30/0241
2019/0095969 A1*  3/2019 Greaves ................ G06Q 30/02
2020/0098025 A1*  3/2020 Walker ............... G06Q 30/0643
2020/0279109 A1*  9/2020 Dubuque ................. G06K 9/46

OTHER PUBLICATIONS

Tooby, Alex, "Shoppable Instagram Feeds—A Guide on How to Enable Product Tagging," Jul. 9, 2019, pp. 1-16.

* cited by examiner

SHOPPABLE ADS WITH QUERY RELEVANT OFFERS

BACKGROUND

This specification relates to displaying shoppable advertisements on a user device.

Users often purchase products online using image search. One common tool is a web search engine, which may be used to search for images of the products. When users search for a product or a product idea, images are delivered by the web search engine in interactive online environments to the user device. Interactive advertising provides opportunities for merchants to target the advertisements of their products to a respective audience. Consequently, such online advertising has become increasingly popular. For example, a user prepares a text query that approximates the requirements of the user, often leading to inaccurate image results without the possibility of a direct interaction with the product advertisement.

SUMMARY

Aspects of the subject matter described herein provide a computer-implemented method displaying shoppable advertisements based on a search query on a user device. In general, one innovative aspect of the subject matter described in this specification can be embodied in methods that include actions of receiving the search query from a user; retrieving an image comprising a plurality of purchasable products related to the search query from a database; calculating a product relevance score for each of the plurality of products within the image based the search query; ranking each of the plurality products based on the product relevance score; selecting a subset of purchasable products based on the ranking; displaying the image comprising the plurality of products; and displaying the shoppable advertisements for the selected subset of purchasable products on a user device. Other embodiments of this aspect include corresponding computer systems, apparatus, and computer programs recorded on one or more memory devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

The systems and methods described herein disclose embedding shoppable advertisements of purchasable products in a candidate image and displaying query relevant shoppable advertisements for a subset of products within the image.

Candidate images are obtained by calculating an image relevance score. A subset of products annotated on the candidate image are obtained by calculation of product relevance scores. Data used to calculate the image relevance scores and product relevance score may include user data, image data, and product data. Indicators may be displayed for the subset of products in the candidate image. The indicators anchored with the products may blink to indicate interactivity to a user. Selection of the indicator corresponding to the product causes display of an offer bubble for the product to which the indicator is anchored. The offer bubble may include: price of the product, offers, sales, or discounts related to the product; user reviews and ratings of the product; shipping information for the product; merchant information of the products; etc.

Figure 1:
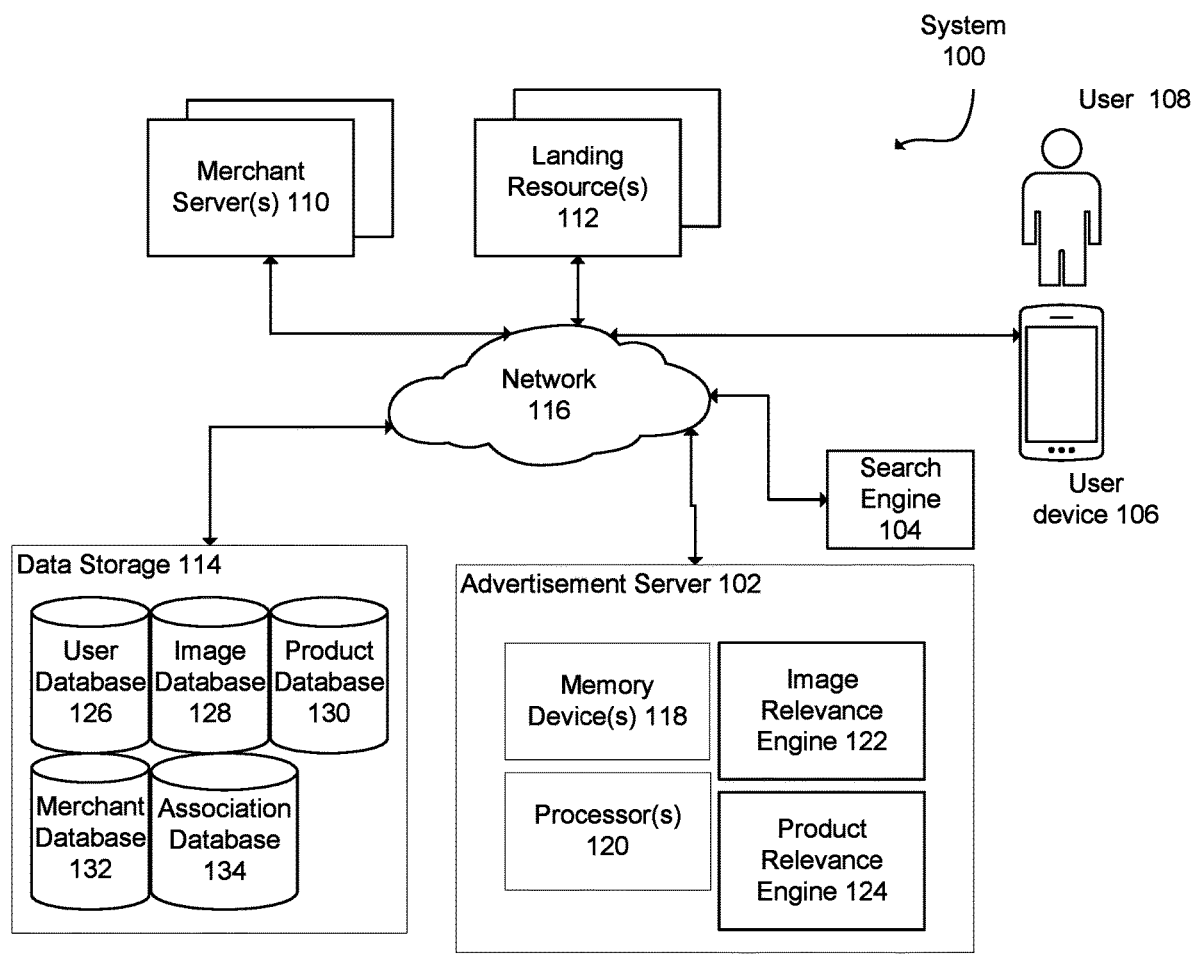
FIG. 1 is a block diagram of an exemplary system, in accordance with aspects of the subject matter disclosed herein.

FIG. 1 is a block diagram of an exemplary system 100, for performing one or more operations consistent with disclosed embodiments. In some embodiments, system 100 includes one or more advertisement servers 102, one or more web search engines 114, one or more user devices 116 associated with one or more users 108, one or more merchant servers 110, one or more landing resources 112, a data storage unit 114 including one or more data storage devices, and a network 116. Advertisement server 102 may include one or more memory devices 118, one or more processors 120, an image relevance engine 122 and a product relevance engine 124. Data storage 114 may include a user database 126, an image database 128, a product database 130, a merchant database 132, and an association database 134.

User device 106 is an electronic device that is under control of user 108 and is capable of requesting and receiving resources over network 116. Example user devices 106 include personal computers, tablets, smartphones, smart devices, mobile communication devices, and other devices that can send and receive data over network 116. User device 106 typically includes a user application, e.g., a web browser, to facilitate the sending and receiving of data over network 116.

User devices 106 submits search queries to advertisement server 102 via web search engine 104. In response, advertisement server 102 accesses data storage 114 to identify candidate images that are relevant to the search query. Advertisement server 102 further identifies purchasable products embedded within the candidate images and returns the search results to user devices 106. Additional details may be embedded within each candidate image including but not limited to a web page title, a snippet of text or a portion of an image extracted from a web page, an offer bubble including product details, indicators and/or a URL of landing resources 112.

Landing resources 112 may include any type of information or data structure that can be provided over network 116. In some implementations, landing resources 112 may be identified by a resource address associated with landing resources 112 (e.g., a URL), web pages (e.g., HTML web pages, PHP web pages, etc.), word processing documents, portable document format (PDF) documents, images, video, programming elements, interactive content, streaming video/audio sources, or other types of electronic information. Landing resources 112 may be identified by a URL associated with a merchant website, a URL associated with a specific product on a merchant website, or a URL associated with a product type or a product category within a merchant website through which a product or service may be purchased.

In some implementations, landing resources 112 include one or more webpages to which a user device 106 is directed (e.g., via an embedded hyperlink) when user 108 interacts with a content item generated by advertisement server 102. In some implementations, landing resources 112 provide additional information relating to a product, service, or business featured in the generated content item. For example, landing resources 112 may be a website through which a product or service featured in the generated content item may be purchased.

In some implementations, the content items generated by advertisement server 102 are advertisements. The advertisements may be image advertisements, flash advertisements, video advertisements, text-based advertisements, or any combination thereof. In other implementations, the content items generated by advertisement server 102 may include offer bubbles, indicators, hyperlinks, annotations, widgets, logos, images, etc.

Components of system 100 are configured to receive a search query from user 108, and retrieve an image including plurality of purchasable products related to the search query from data storage 114. User 108 enters the search query as a text query into user device 106 using web search engine 104. User device 106 may be capable of communicating with advertisement server 102 via network 116. Advertisement server 102 may be capable of communicating with data storage 114, merchant server 110 and landing resources 112 via network 116. In response to receiving a text query from user 108, advertisement server 102 retrieves an image including of plurality of purchasable products from data storage 114.

These actions may be performed automatically, i.e., by any machine-executable process and/or a process that does not require human intervention or input. When user 108 enters a text query related to a product or product idea that user 108 wants to purchase, advertisement server 102 calculates an image relevance score for retrieving an image and a product relevance score for products in the image. The Image relevance score is a relevancy measure of an image to at least the text query, calculated by advertisement server 102 in order to retrieve an image with a high relevance score to the text query as a candidate image. Product relevance score is a relevancy measure of a purchasable product within the candidate image to at least the text query, calculated by advertisement server 102 to identify a subset of purchasable products from the plurality of products displayed on the candidate image. The image relevance score is used to extract one or more candidate images from data storage 114 and the product relevance score is used to retrieve a subset of purchasable products from the plurality of products displayed on the candidate image and rank the purchasable products embedded in the candidate image. For example, the image relevance score and product relevance score may be based on relevance to the text query, user data, image data, merchant data, and/or product data.

Advertisement server 102 may store the user data, e.g., in user database 126. User data may include query history, interaction history, and location of user 108. Query history may include past text queries entered into web search engine 104 by user 108. Interaction history may include hyperlinks, images, products, merchant websites, etc. that user 108 has previously interacted with. Interaction may include any type of interaction with the images including but not limited to, clicks, scroll, swipe, or touch using a finger or a mouse, location of user 108, etc. Query history, interaction history and location of user 108 may not be tethered to the identity of individual users.

Advertisement server 102 may store the merchant data, e.g., in merchant database 132. Merchant data may include various purchasable products sold by the merchant, images of the purchasable products sold by the merchants, images with purchasable products embedded in the images, images displaying environments in which purchasable products may be embedded, merchant locations, merchant hours, discounts or sales offered by the merchants, etc.

Advertisement server 102 may store image data, e.g., in image database 128. The stored image data may include images that are available for access by the general public, e.g., in image ads available on the web, images obtained from specific merchants, images displaying specific products, images displaying purchasable products, images displaying environments in which purchasable products may be embedded, etc. Image data may further include computer vision signals, similar images on the web, etc. Image data may include images with purchasable products embedded in the images.

Image data may also include a prominence score for each product in the shoppable image. For example, a shoppable image for a "laundry room" may include washer, dryer, laundry bag, drying rack, pedestals under washer/dryer units, storage units, hangers, wall units, cabinets, sink, laundry detergent, etc. Each one of the products may have a prominence score based on the merchants selling the products. The prominence score is an estimation of a product's visibility on a candidate image. For example, if the merchant is an appliance store, the prominence score of washer and dryer units will be high and if the merchant is a home furnishing store, the prominence score of storage units, hangers, wall units, cabinets, etc. will be high. Image data may be obtained from merchant servers 110. Merchants interested in selling products to user 106 may send images with purchasable products and prominence scores to advertisement server 102. Advertisement server 102 may then calculate a product relevance score for each of the plurality of purchasable products using the prominence score for each of the plurality of purchasable products received from the merchants.

In some implementations, merchants may not provide prominence scores with the image data. In such a case advertisement server 102 may calculate the prominence score based on image data, user data, product data and/or merchant data. For example, user 108 may enter a search query, for example, "laundry room." A shoppable image for a "laundry room" may include washer, dryer, laundry bag, drying rack, pedestals under washer/dryer units, storage units, hangers, wall units, cabinets, sink, laundry detergent, etc. Advertisement server 102 may calculate a prominence score for each of the washer, dryer, laundry bag, drying rack, pedestals under washer/dryer units, storage units, hangers, wall units, cabinets, sink, laundry detergent, etc. For example, based on the user data which may include query history, interaction history, and location of user, the prominence score for the products may change. The user query history may indicate that user 106 has been searching for washer and dryer units. The calculated prominence score for the washer and dryer units may be higher than the other products. Advertisement server 102 may then calculate a product relevance score for each of the plurality of purchasable products using the prominence score for each of the plurality of purchasable products.

Advertisement server 102 may further store product data, e.g., in product database 130. Product data may include product information such as name and description of the product, price of the product, merchants that sell the product, sales, offers or discounts available for the product, availability of the product at different merchant locations, availability of the product on different merchant websites, prices of the product offered by different merchants, etc.

Advertisement server 102 may further compile association data and store the association data, e.g., in association database 134. Compiling association data may include mapping images and products embedded in the images with textual keywords. Compiling association data may also include mapping images and products embedded in the images with user data. Compiling association data may also include mapping images and products embedded in the images with product data. Advertisement server 102 may communicate with merchant servers 110 to obtain image data and product data from multiple merchants. Image data and product data obtained from merchant servers 110 contains mapping between each image and a product that is present in the image. Advertisement server 102 may further compile additional data which associates the images and products embedded in the images with textual keywords. Advertisement server 102 may periodically request merchant servers 110 to send the image data. In response, merchant server 110 may send the requested data to advertisement server 102, and advertisement server 102 may periodically update association database 134 accordingly.

In some implementations, advertisement server 102 may compile association data using concepts of image obtained from merchants. For example, a merchant ABC may only provide an image of a living room. Advertisement server 102 may retrieve images of purchasable products sold by merchant ABC from merchant database 132. For example, purchasable products may include, a couch, chairs, a TV table, a television, a carpet, lamps, coffee tables, side tables, window blinds, window curtains, curtain rods, etc. Advertisement server 102 may embed the retrieved images of purchasable products in the image of the living room.

In some implementations, advertisement server 102 may obtain additional information or product data related to the purchasable products including but not limited to name and description of the product, price of the product, sales, offers or discounts available for the product, availability of the product at different locations of merchant ABC, etc. Advertisement server 102 may embed the retrieved product data in the image. Advertisement server 102 may calculate image relevance score and product relevance score. Based on the calculated scores, advertisement server 102 may display the shoppable advertisement including image of the living room, purchasable products embedded in the image, and offer bubbles displayed for subset of the purchasable products based on image relevance score and product relevance score.

Figure 2:
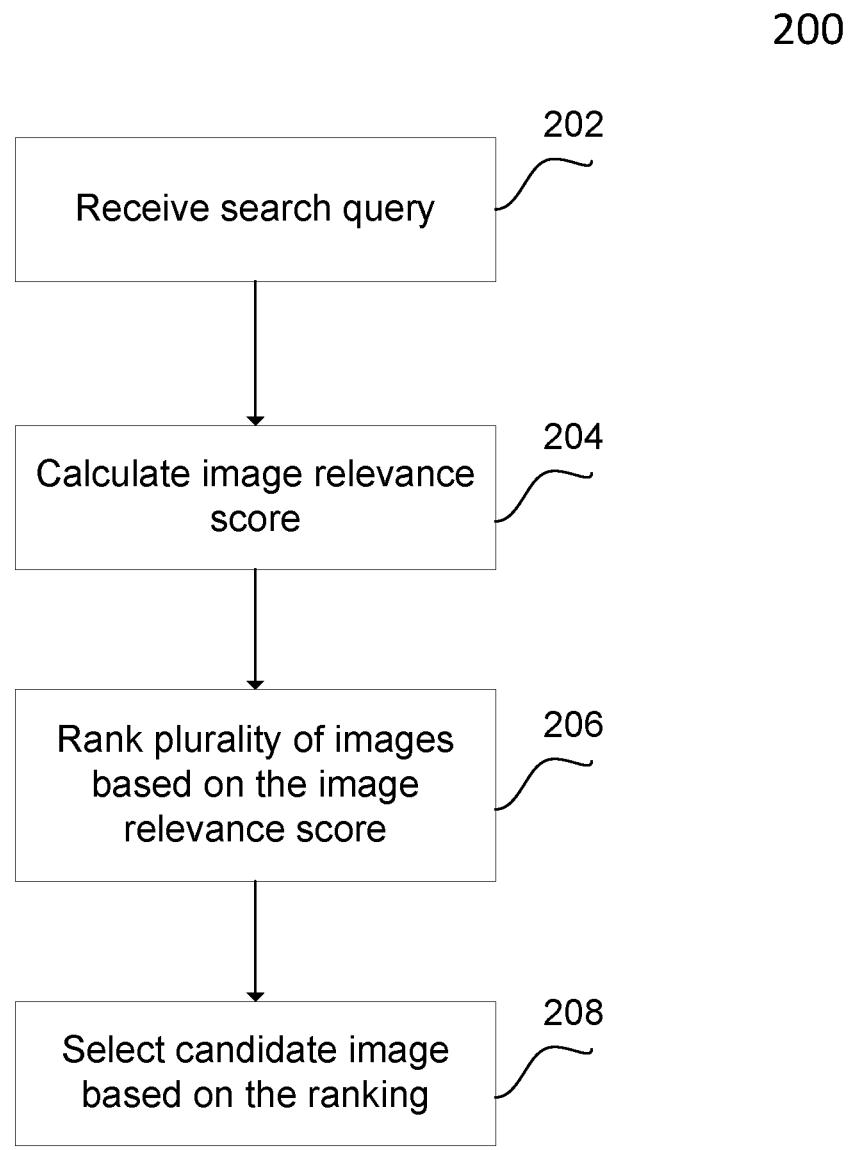
FIG. 2 is a flowchart of an exemplary process, consistent with disclosed embodiments.

FIG. 2 is a flowchart illustrating an exemplary method 200 for calculating image relevance score.

In block 202, advertisement server 102 receives a search query, for example "laundry room", entered by user 108 on user device 106. Data storage 114 may include a plurality of images displaying purchasable products potentially corresponding to the search query. Advertisement server 102 retrieves the user data, image data, merchant data and/or product data associated with the search query, for example, "laundry room" from association database 134. In block 204, advertisement server 102 calculates an image relevance score for each of the plurality of images using the retrieved association data. In block 206, advertisement server 102 ranks the plurality of images based on the image relevance score. In block 208, advertisement server 102 selects one or more candidate images to be displayed on user device 106 based on the image relevance score. The rank of the image may determine the placement of the image on user device 106. Image with the highest rank may be placed, for example, at the center of the screen of user device 106 in a large image format and images with lower ranks may be placed around the image with the highest rank in a standard format (e.g. a two-column format).

Figure 3:
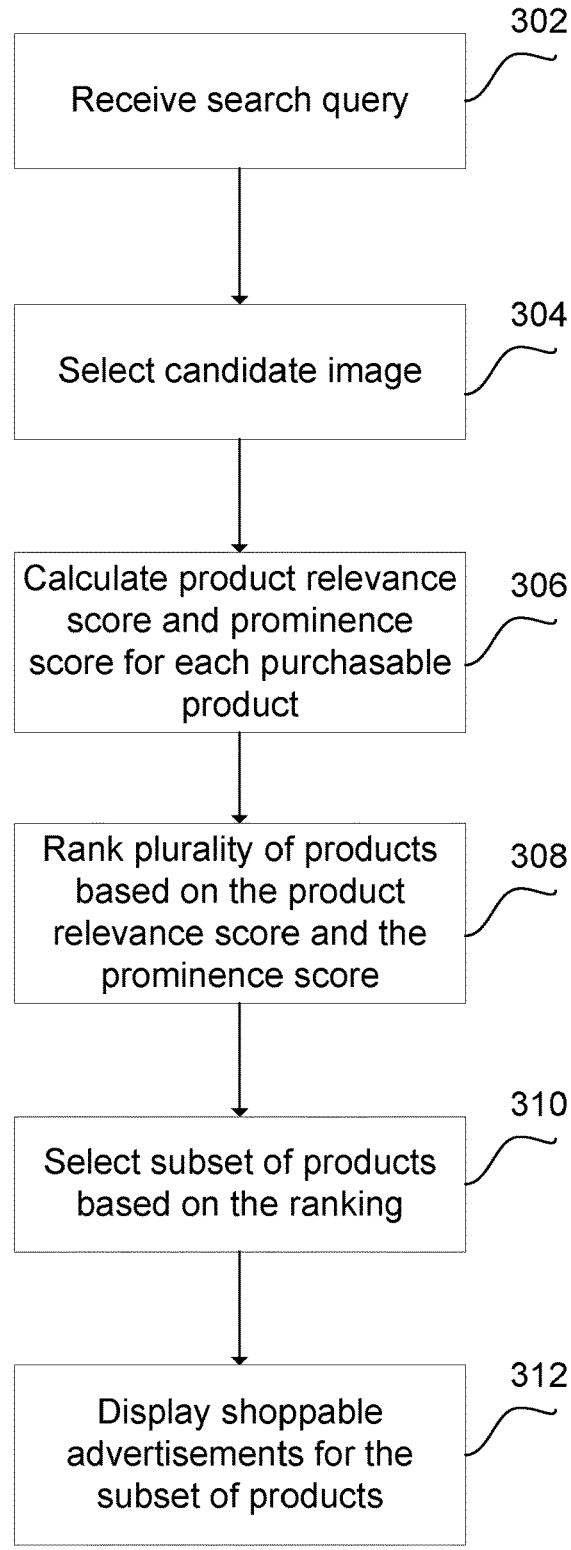
FIG. 3 is a flowchart of an exemplary process, consistent with disclosed embodiments.

FIG. 3 is a flowchart illustrating an exemplary method 300 for calculating product relevance score.

In block 302, advertisement server 102 receives a search query, for example, "laundry room", entered by user 108 on user device 106. Data storage 114 may store plurality of images displaying purchasable products. In block 304, referring to FIG. 2 at 208, advertisement server 102 selects a candidate image, from the plurality of images stored in data storage 114, to be displayed on user device 106. The selected candidate image may include plurality of purchasable products. Advertisement server 102 retrieves association data such as, for example, user data, image data, merchant data and/or product data associated with the search query, for example "laundry room", from association database 134. In block 306, advertisement server 102 calculates a product relevance score for each of the plurality of purchasable products using the association data and a prominence score for each of the plurality of purchasable products. In block 308, advertisement server 102 ranks the plurality of purchasable products based on the product relevance score and the prominence score. In block 310, advertisement server 102 selects a subset of purchasable products to be displayed on user device 106 based on the ranking. In block 312, advertisement server 102 displays shoppable advertisements for the subset of products.

The number of products included in the subset may be determined by a measure of visual appeal. For example, the number of products may be selected so as to avoid covering too much of the candidate image and to avoid/minimize overlapping of offer bubbles. Advertisement server 102 determines the measure of visual appeal based on placement of products in the candidate image in consideration of, for example, size of the offer bubbles, size of the purchasable products embedded in the candidate image, distance between the plurality of purchasable products in the candidate image, etc. For example, if two products are placed within 1-2 millimeters of each other, there is a chance that respective offer bubbles for these products may overlap.

Figure 4:
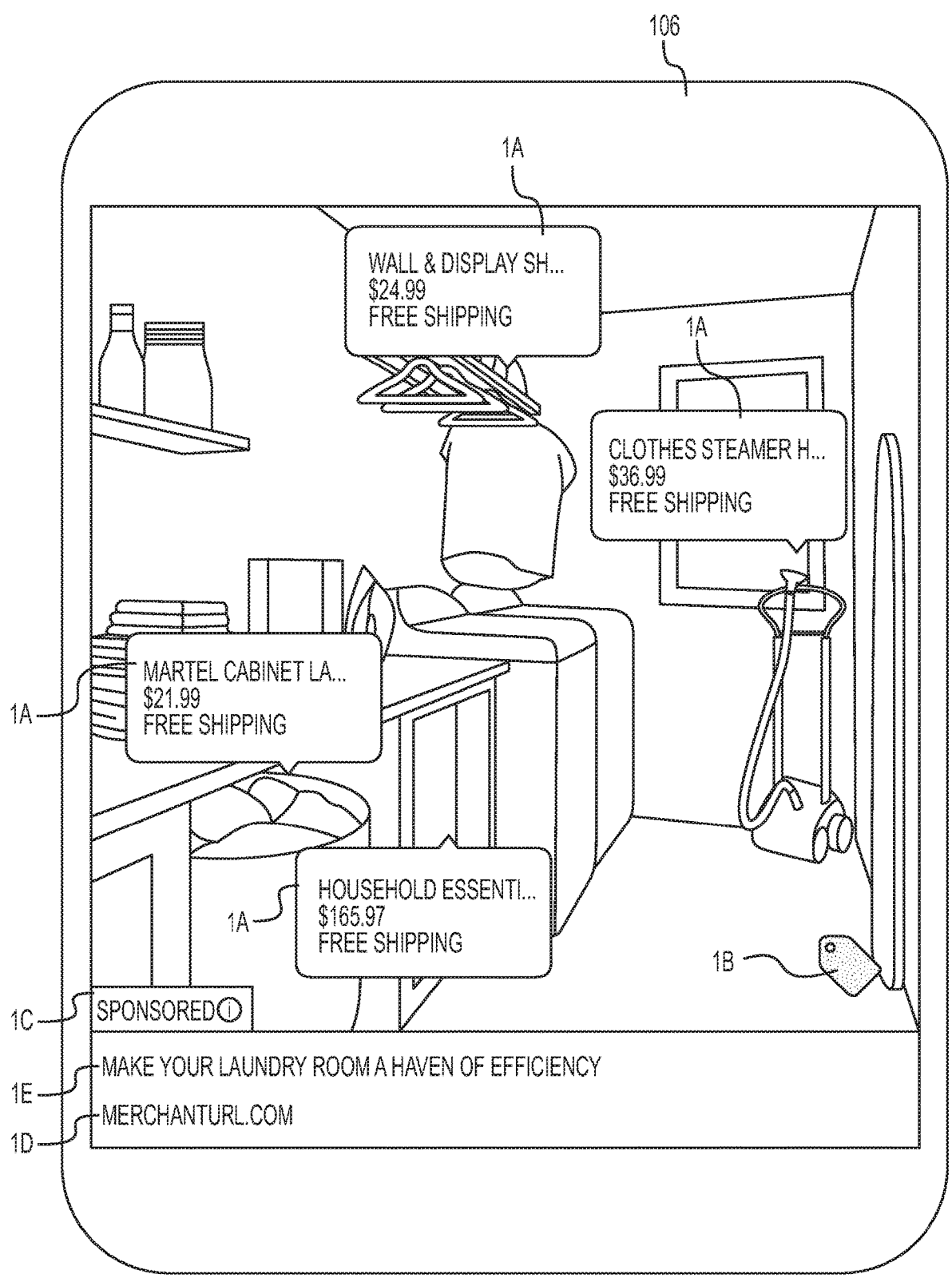
FIG. 4 represents an example graphical user interface used for displaying shoppable advertisements.
Figure 5:
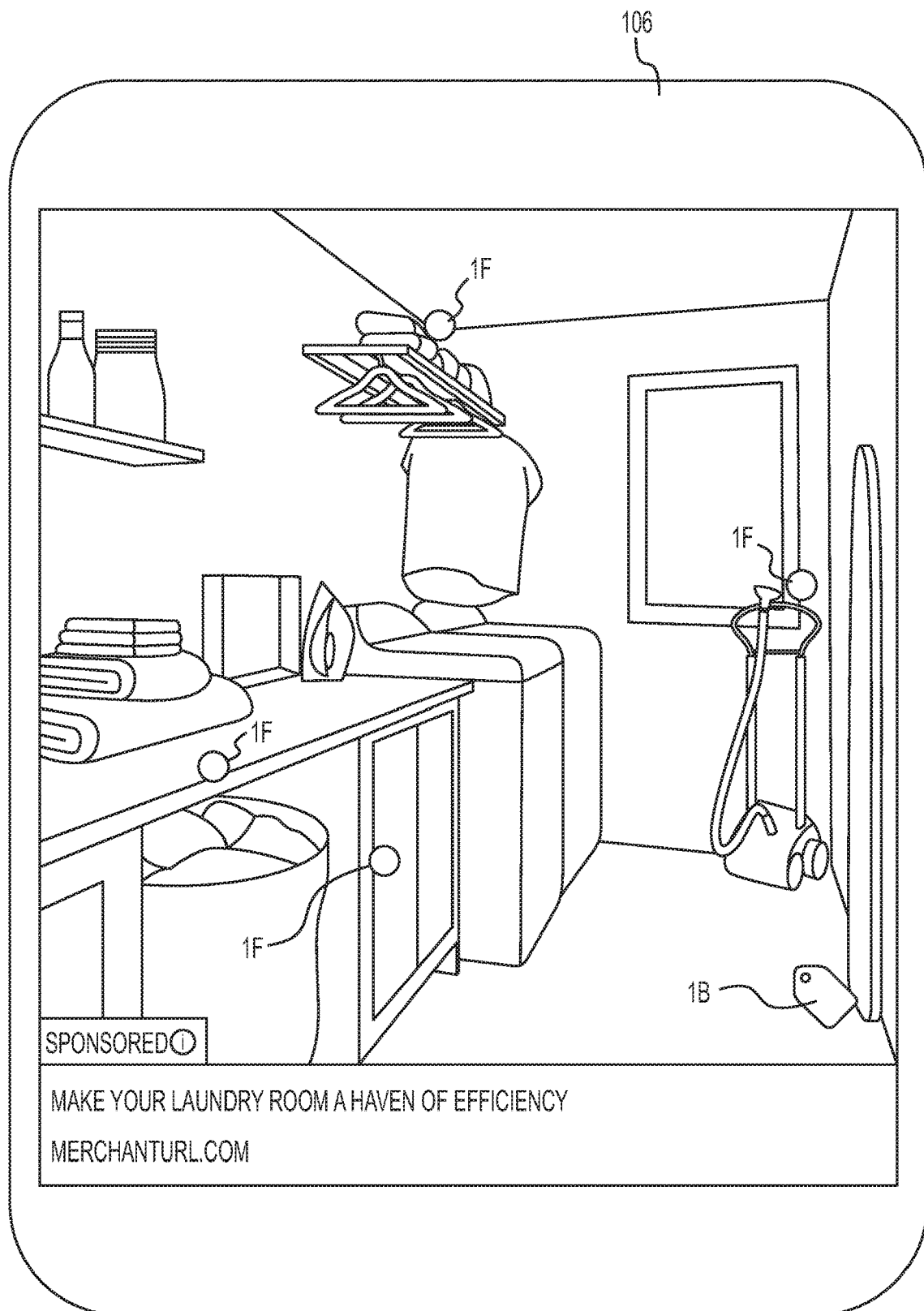
FIG. 5 represents an example graphical user interface used for displaying shoppable advertisements.
Figure 6:
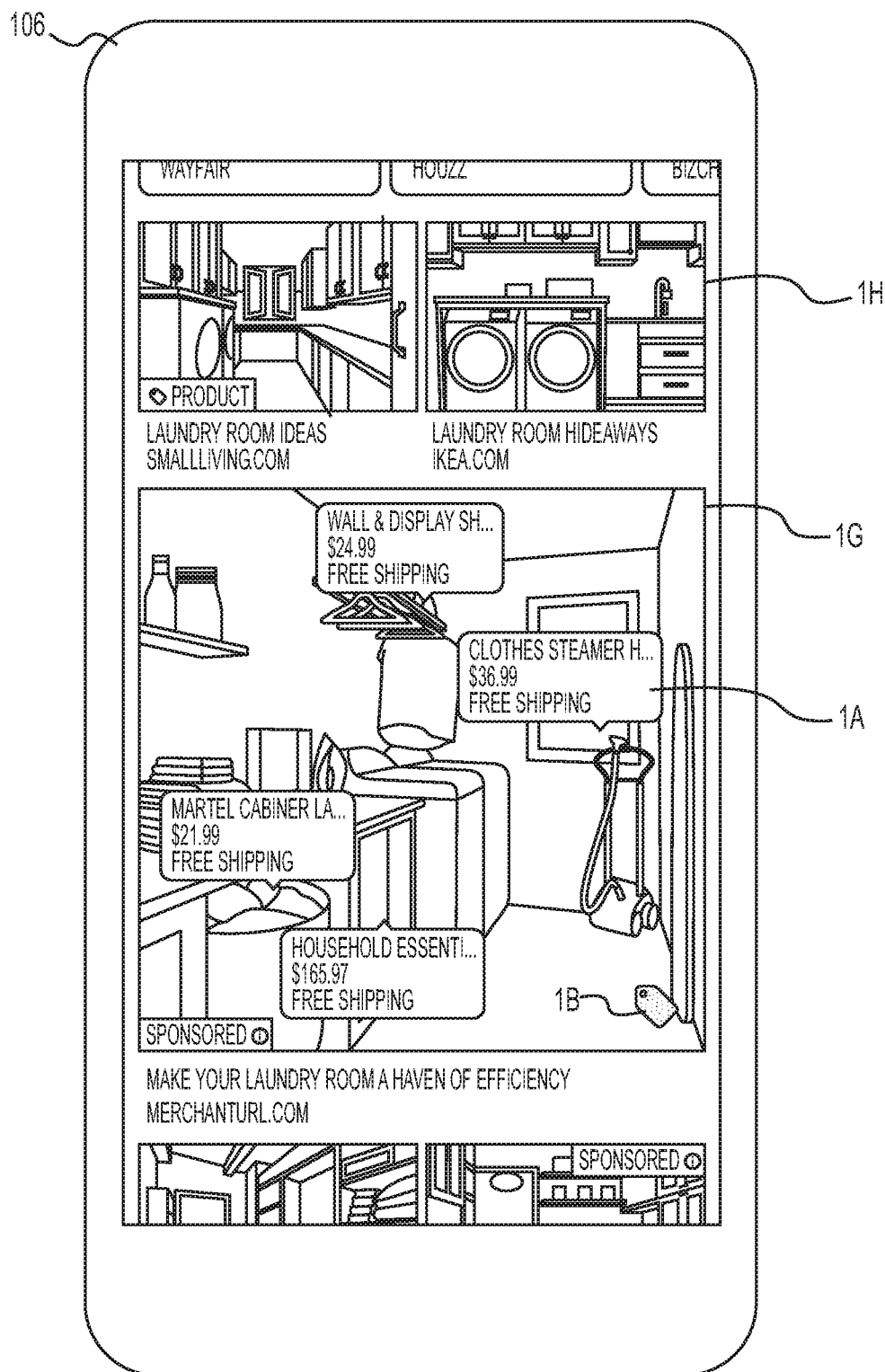
FIG. 6 represents an example graphical user interface used for displaying shoppable advertisements.

FIGS. 4-6 represent an example graphical user interface used for displaying shoppable advertisements on a display screen of user device 106. FIGS. 4-6 display an exemplary candidate image and subset of purchasable products obtained using image relevance score calculation and product relevance score calculation. FIGS. 4 and 6 display exemplary shapes for offer bubbles, although other offer bubble shapes, which may perform the functions discussed herein, may be desirable based on aesthetic considerations. FIG. 5 displays exemplary shapes for offer indicators, although other indicator shapes which may perform the functions discussed herein, may be desirable based on aesthetic considerations. FIGS. 4-6 also display the exemplary content items generated by advertisement server 102.

Content item 1A represents offer bubbles, content item 1B represents a toggle button, content item 1C represents a "sponsored" badge, content item 1D represents text including a hyperlink or URL to the merchant website, content item 1E represents description of the candidate image, content item 1F represents offer indicators, content item 1G represents placement of a candidate image with highest rank, for example, at the center of the screen of user device 106 in a large image format and content item 1H represents placement of images with lower ranks, for example, around the image with the highest rank, in a standard format (e.g., a two-column format) on the screen of user device 106.

Offer bubbles 1A may be displayed for the subset of purchasable products. Offer bubbles 1A may be spaced on the image so that they do not overlap each other. Each offer bubble may display information related to the product it appears next to. Offer bubbles 1A may display product name, price, and an annotation. The number of offer bubbles 1A displayed may represent the number of purchasable products in the image. A hyperlink to the product webpage of a merchant may be embedded within each offer bubble 1A.

The first line of text of offer bubble 1A displays a product name which is static information. The second line of text of offer bubble 1A displays the price of the product, which may change and is therefore dynamic. The third line of text of offer bubble 1A displays annotation, which may also be dynamic. The price of the product may change if the merchant selling the product is offering a sale or discount. The annotation may include one or more of product ratings, user reviews, shipping information, offer title, sale or discount information, product availability information, etc. For example, if the merchant selling the product offers free shipping, the annotation displayed may be "free shipping" or if a particular product is on sale, the annotation displayed may be "take additional 50% off", etc.

Each candidate image may include a toggle button 1B. User interaction (for example, touch, tap, swipe, etc.) with the toggle button 1B toggles the offer bubbles 1A and replace them with indicators 1F, and vice versa. Toggle button 1B may be represented by a price tag icon. Alternatively, toggle button 1B may also be represented by a price tag icon contained inside a circle to create more separation from the background of the candidate image. Alternatively, toggle button 1B may also be represented by any other shape, which may perform the functions discussed herein, based on aesthetic considerations.

Indicators 1F may be anchored on the candidate image for the subset of purchasable products. The number of indicators 1F displayed may represent the number of purchasable products in the image. Indicators 1F may be anchored upon each product to represent interactivity. Indicators 1F may also blink to indicate interactivity to user 108.

When toggle button 1B is ON, offer bubbles 1A are displayed and the price tag icon representing toggle button 1B may be blue in color. When user 108 interacts with toggle button 1B, it is turned OFF and indicators 1F are displayed in place of offer bubbles 1A and the price tag icon may be white in color. Or, toggle button 1B may have any other appearance in the ON condition and any other contrasting appearance in the OFF condition, based on aesthetic considerations. Alternatively, user 108 may interact (for example, touch, tap, swipe, etc.) with indicators 1F to display offer bubbles 1A. Selection of the indicator 1F corresponding to a specific purchasable product may display an offer bubble 1A only for that product to which the indicator 1F is anchored. For example, if user 108 interacts with indicator 1F anchored to a washing machine, offer bubble 1A for the washing machine will be displayed instead of the indicator 1F.

In some implementations, indicators 1F may be completely removed to provide exposure of the candidate image to user 108 and provide user 108 with a seamless experience. In such a case, similar products, merchants and related queries may be displayed below the candidate image. Related queries may include similar search queries provided by other users for purchasing similar products. Additionally, or alternatively, a number may be displayed alongside toggle button 1B. The number may indicate a number of purchasable products embedded in the candidate image. This may eliminate the need to include indicators 1F.

Figure 7A:
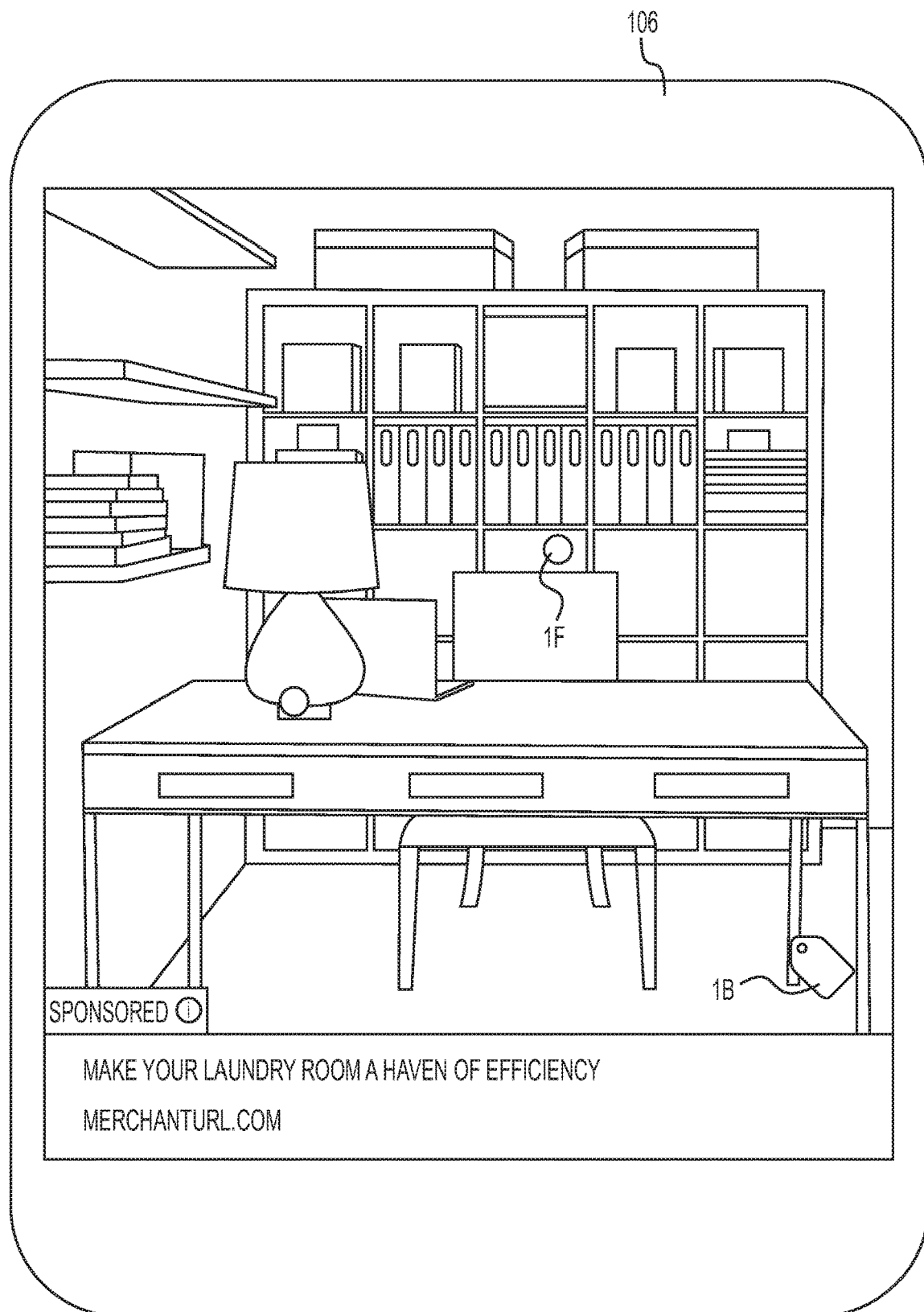
FIGS. 7A-7E represent aspects of an example graphical user interface used for displaying shoppable advertisements.
Figure 7B:
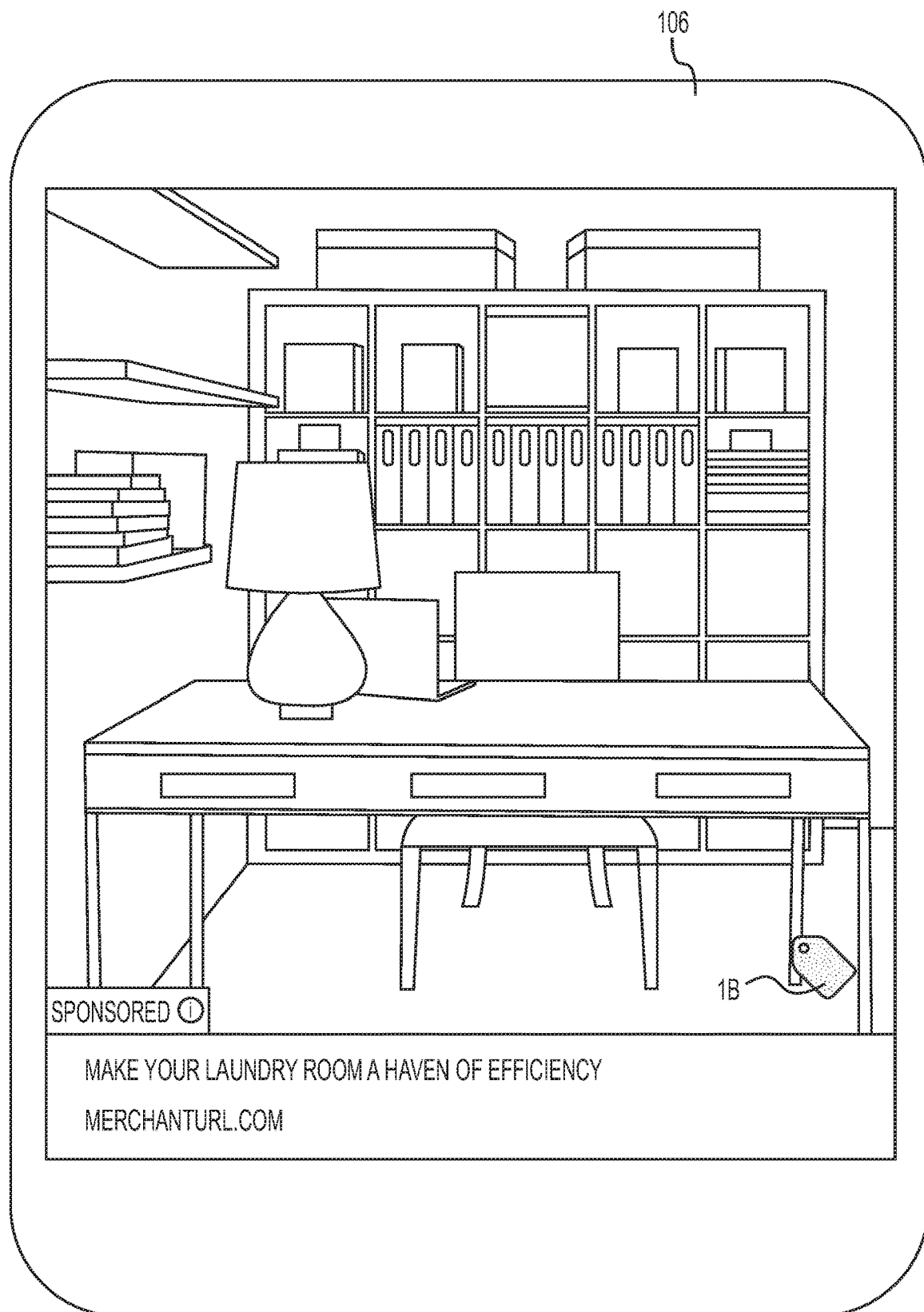
Figure 7C:
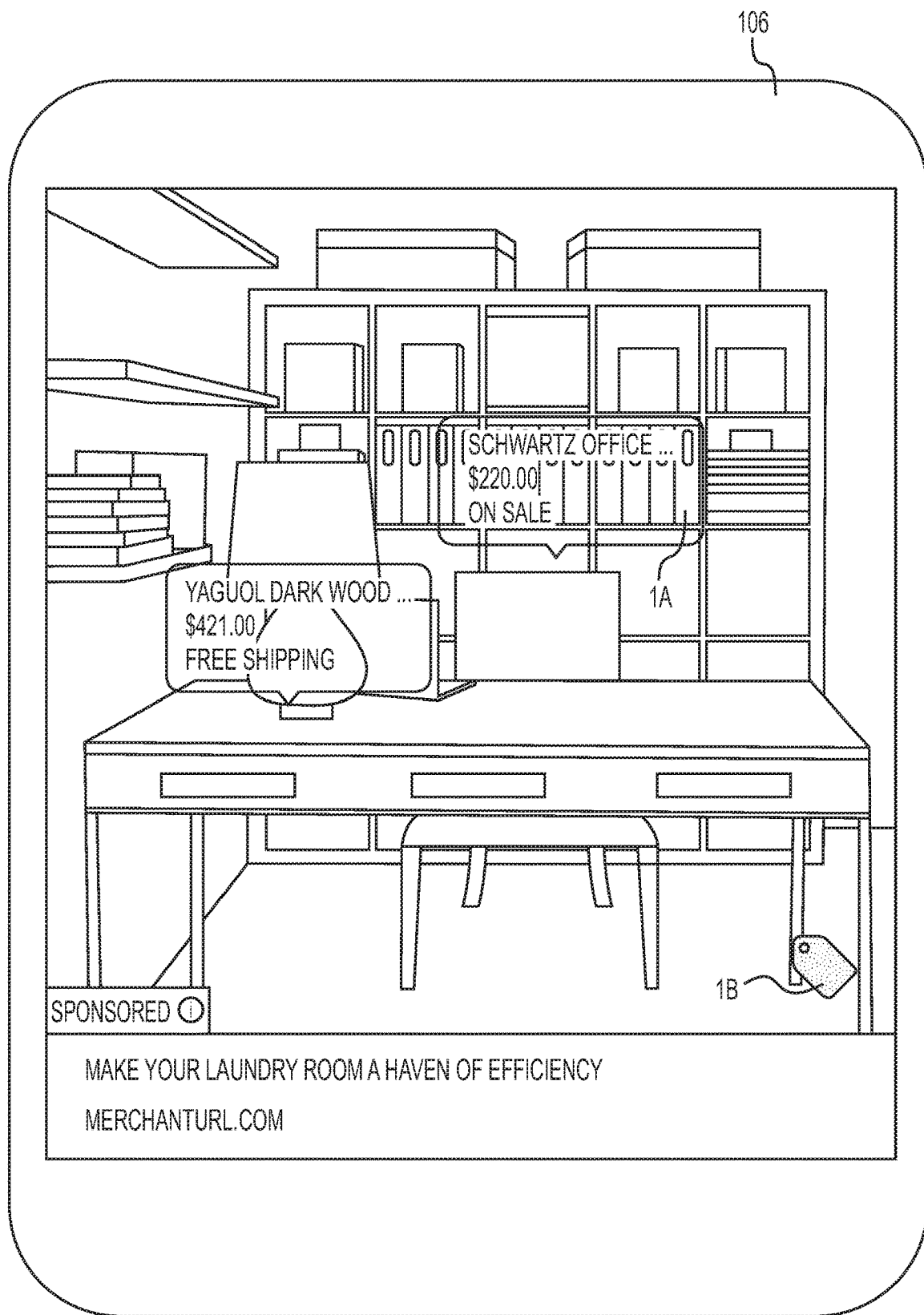
Figure 7D:
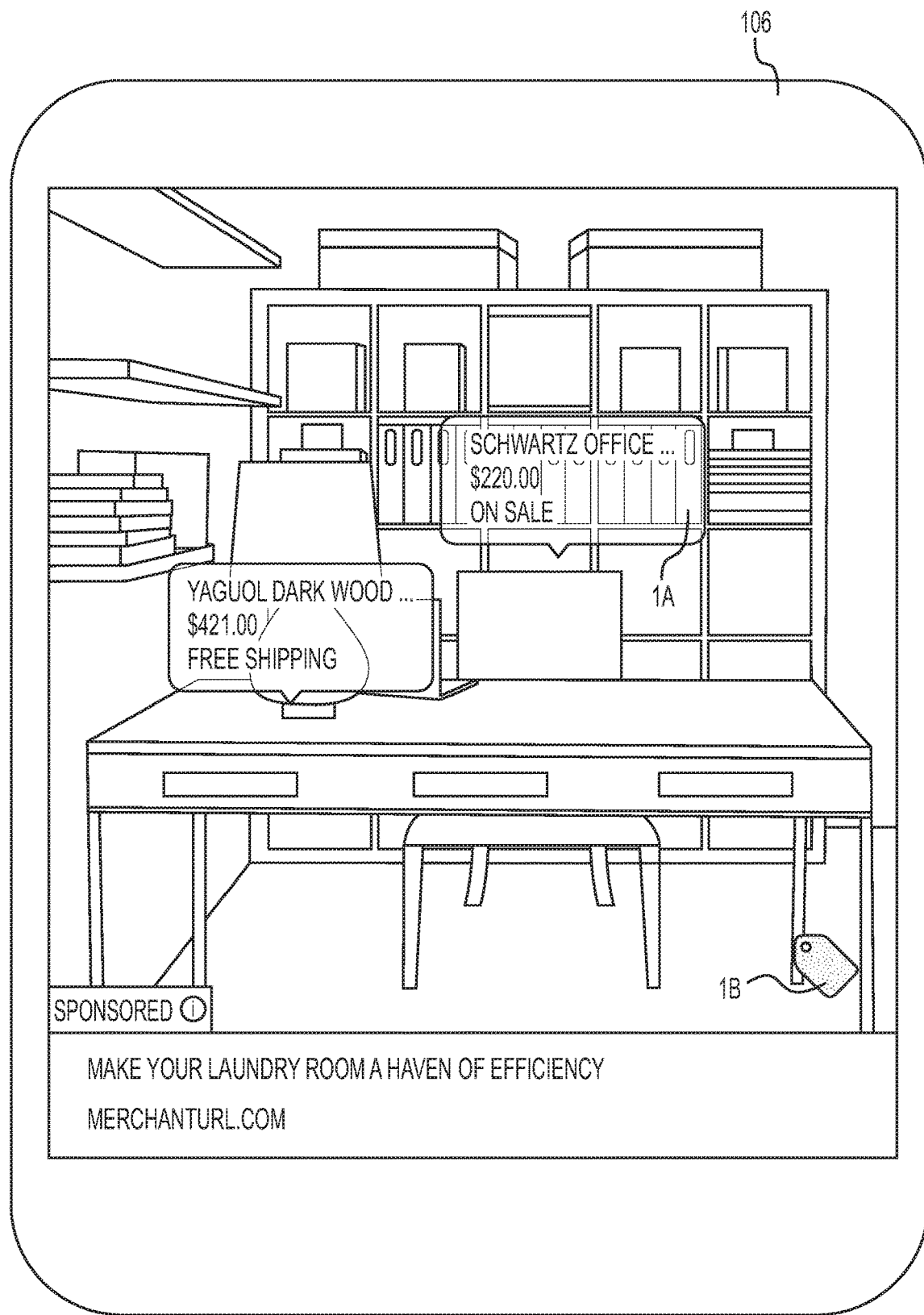
Figure 7E:
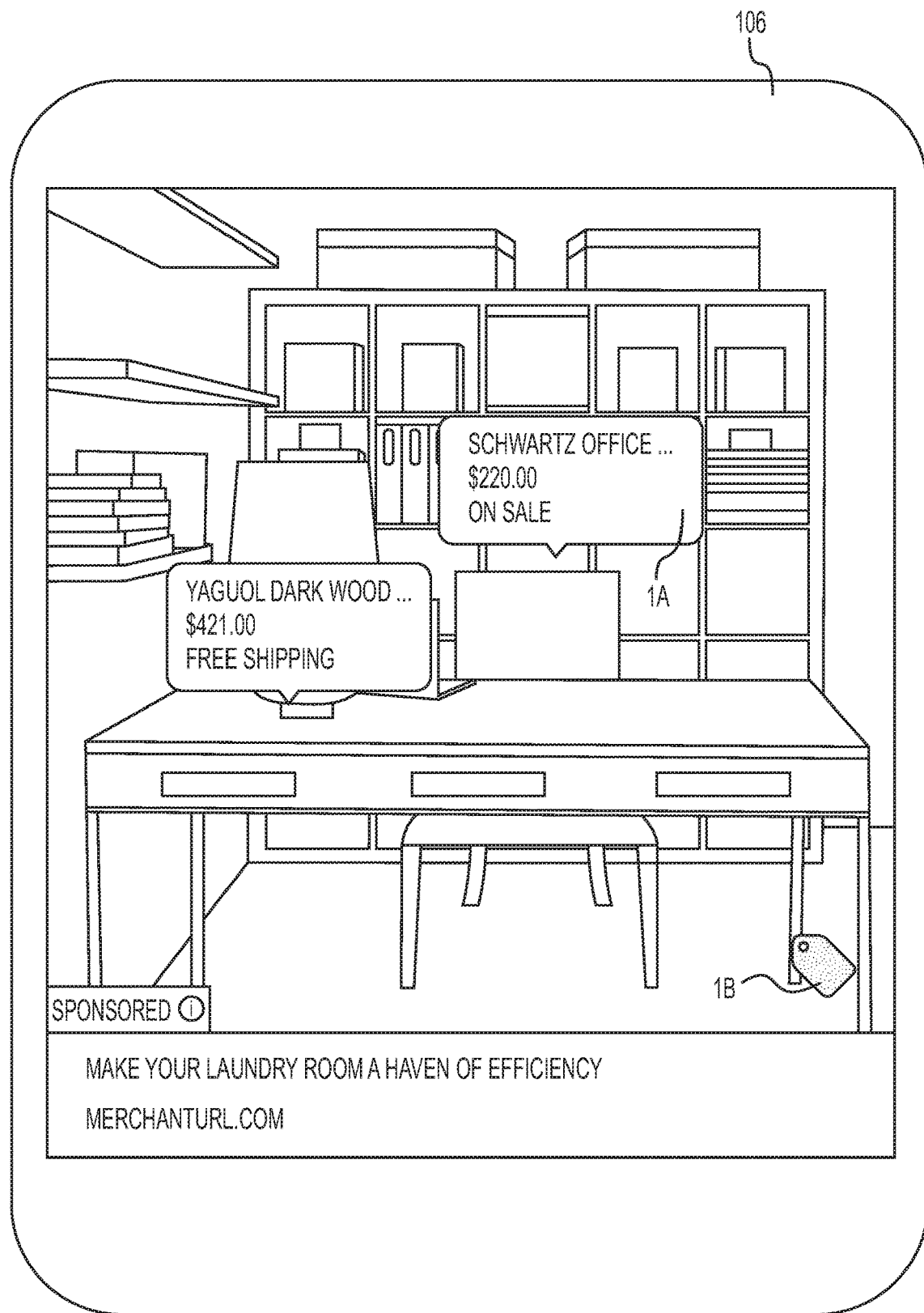

FIGS. 7A-7E display an exemplary animation flow from indicators 1F to offer bubbles 1A. According to the animation flow, when user 131 interacts with toggle button 1B, the indicators 1F disappear and offer bubbles 1A start appearing. FIG. 7A-7E indicate this flow. FIG. 7A shows a candidate image of a home office before the user interacts with toggle button 1B when indicators 1F are anchored to purchasable products. Toggle button 1B is unshaded to represent display of a first color, e.g., white. FIG. 7B shows the candidate image when user 108 interacts with toggle button 1B at 0 seconds. Indicators 1F disappear and the opacity of offer bubbles is 0%. Toggle button 1B is shaded to represent display of a first color, e.g., blue. In FIGS. 1C-1E the opacity of offer bubbles 1A continuously increases to 100%. Thus, for example, FIG. 7C shows the opacity of offer bubbles 1A has increased to 25%, e.g. 0.3 seconds, after user 108 interacts with toggle button 1B. FIG. 7D shows the opacity of offer bubbles 1A has increased to 75%, e.g. 0.6 seconds after user 108 interacts with toggle button 1B. FIG. 7E shows the opacity of offer bubbles 1A has increased to 100%, e.g. 0.9 seconds, after user 108 interacts with toggle button 1B.

In some implementations, additional content items not disclosed in FIGS. 4-7E may include merchant toggle, style filters, merchant filters, share buttons, merchant logos, etc. User interaction with a merchant toggle button may allow user 106 to find merchants selling similar products. For example, if user 106 is searching for "jewelry" and the candidate image displayed on user device 108 is a necklace from Anthropologie®, user 108 may interact with the merchant toggle button to find different merchants selling similar jewelry. User interaction with a style filter may allow user 108 to filter merchants by style. For example, if user 108 is searching for "vintage furniture" and the candidate image displayed on user device 106 is a chair from Pottery Barn®, user 108 may interact with the style filter to find different merchants selling vintage furniture.

In some implementations, candidate images may be displayed in the form of an immersive grid. For example, candidate images may be selected in groups of four images by advertisement server 102. Each group of images may represent different styles, concepts or ideas. For example, user 106 may enter a text query "living room ideas" and multiple image groups including four candidate images in each group may be displayed. Each image group may represent different living room concepts, for example, mid-century modern, transitional, modern, rustic and so on. Such types of implementations may educate users in their shopping journey about different styles and categories related to their text query.

Figure 8:
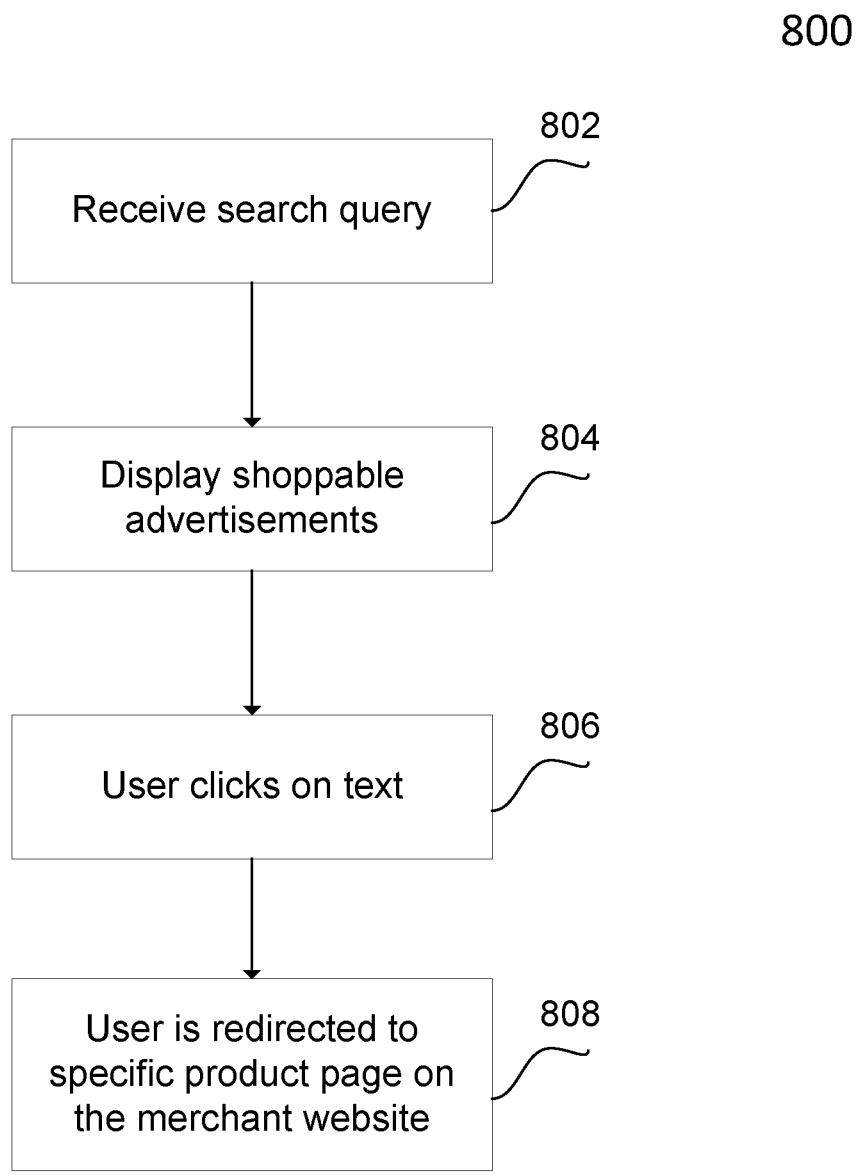
FIG. 8 is a flowchart of an exemplary process, consistent with disclosed embodiments.

FIG. 8 is a flowchart illustrating an exemplary method 800 of user interaction with candidate image.

In block 802, advertisement server 102 receives a search query, for example "laundry room", entered by user 108 on user device 106. Data storage 114 may include a plurality of images displaying purchasable products. In block 804, referring to FIG. 3 at 312, advertisement server 102 displays shoppable advertisements to user 108. In block 806, user interacts with content item 1D (FIG. 4) which represents text including a hyperlink to or URL of the merchant website. In block 808, user 108 is redirected to the specific product page of the merchant website. For example, offer bubble 1A may display product information for a Samsung® washing machine from Home Depot®. In such a case, user 108 may be redirected to the webpage for the Samsung® washing machine on the Home Depot® website.

Alternately, when user interacts with content item 1D (FIG. 4) which represents text including a hyperlink to or URL of the merchant website, user 108 may be directed to main page of the merchant website. For example, offer bubble 1A may display product information for a Samsung® washing machine from Home Depot®. For example, candidate image 1G (FIG. 6) may display purchasable products related to a "laundry room" sold by Home Depot®. In such a case, user 131 may be redirected to the home page of the Home Depot® website.

Figure 9:
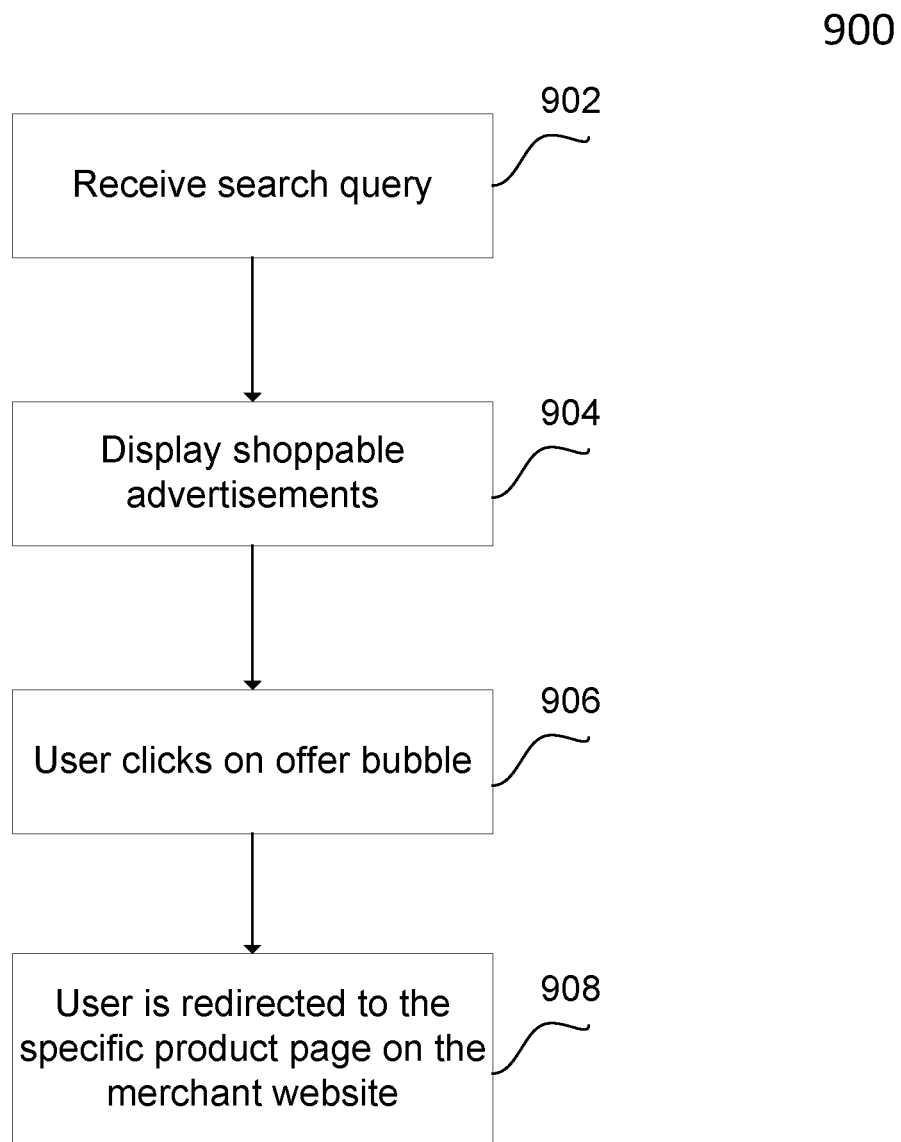
FIG. 9 is a flowchart of an exemplary process, consistent with disclosed embodiments.

FIG. 9 is a flowchart illustrating an exemplary method 900 of user interaction with candidate image.

In block 902, advertisement server 102 receives a search query, for example "laundry room", entered by user 108 on user device 106. Data storage 114 may include a plurality of images displaying purchasable products. In block 904, referring to FIG. 3 at 312, advertisement server 102 displays shoppable advertisements to user 108. In block 906, user 108 interacts with content item 1A (FIG. 4) which represents an offer bubble. In block 908, user 108 is redirected to the specific product page of the merchant website. For example, offer bubble 1A may display product information for a Samsung® washing machine from Home Depot®. In such a case, user 108 may be redirected to the webpage for the Samsung® washing machine on the Home Depot® website.

Figure 10:
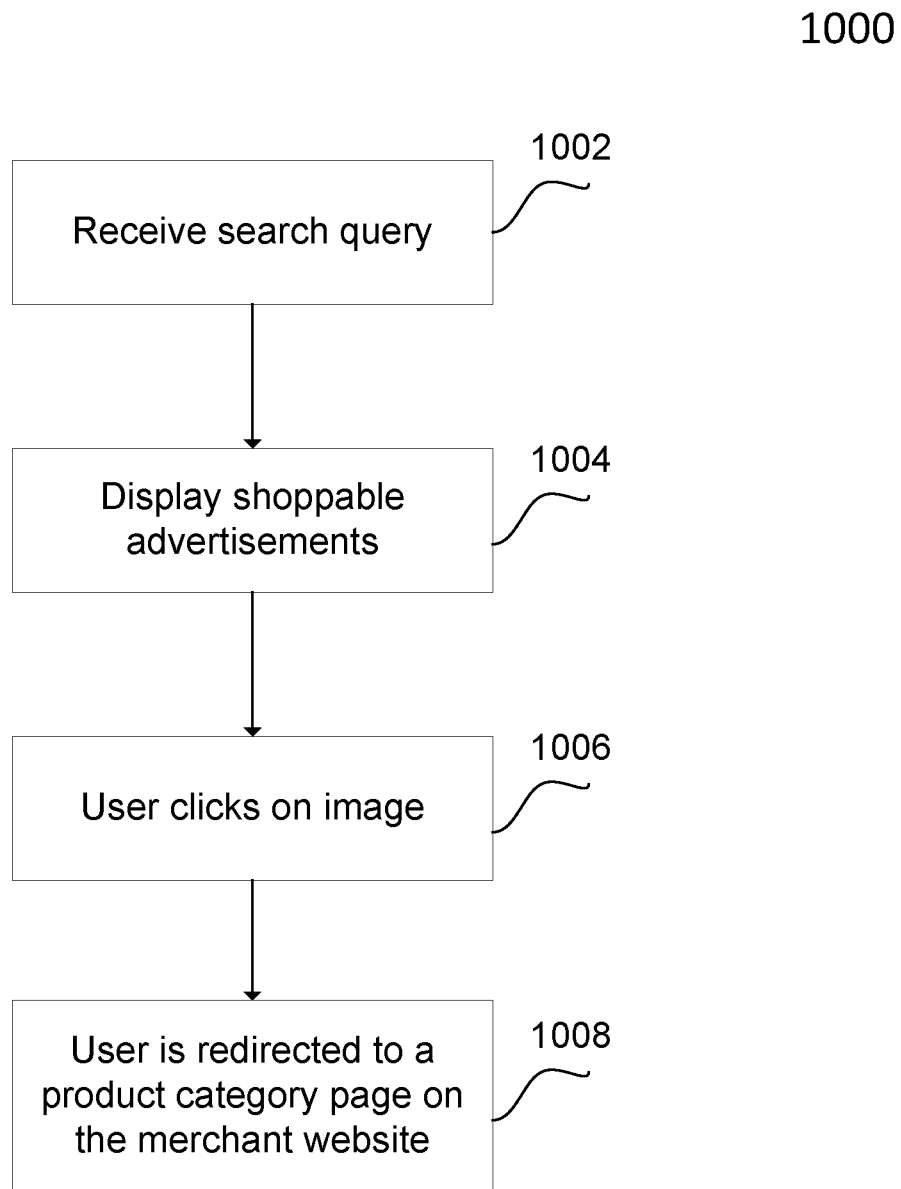
FIG. 10 is a flowchart of an exemplary process, consistent with disclosed embodiments.

FIG. 10 is a flowchart illustrating an exemplary method 1000 of user interaction with candidate image.

In block 1002, advertisement server 102 receives a search query, for example "laundry room", entered by user 108 on user device 106. Data storage 114 may include a plurality of images displaying purchasable products. In block 1004, referring to FIG. 3 at 312, advertisement server 102 displays shoppable advertisements to user 108. In block 1006, user interacts with content item 1G (FIG. 6) which represents the candidate image. In block 1008, user 108 is redirected to a product category page of the merchant website. For example, candidate image 1G may display purchasable products related to a "laundry room" sold by Home Depot®. In such a case, user 108 may be redirected to the webpage for the product category "Laundry" on the Home Depot® website.

Although delivering advertisements embedded in images to users of various data access and interface services and devices is an established practice, the development of interactive advertisements that allow users to do more than simply select or "click" on the image to be taken to a landing resource, allows for improvements and enhancements in advertisement delivery. Currently, image searches fail to provide additional information about how to purchase a product, price and store information of the product and a possibility of a direct interaction with the product advertisement. Embodiments consistent with the present disclosure provide an improvement in advertisement delivery, by displaying shoppable advertisements to users with which users can easily interact and obtain additional information about the purchasable products.

Embodiments consistent with the present disclosure can be implemented so as to realize one or more of the following advantages. For various reasons, users may appreciate assistance in identifying desired products within images. For example, the subject matter described herein may facilitate user discovery of a desired product faster than the user would have otherwise been able to locate or identify the product. In addition, products may be identified and located for a user, even if the user is unaware of what the product looks like. Direct interaction of the user with the product advertisement further enables the user to quickly identify desired products. This improves the technological field of query-based searching and displaying interactive targeted advertisements to users and is thus another distinct advantage realized by the systems and methods described herein.

Further to the description above, a user may be provided with controls allowing the user to make an election as to both if and when systems, programs, or features described herein may be enabled collection of user information (e.g., information about a user's social network, social actions, or activities, profession, a user's preferences, or a user's current location), and if the user is sent content or communications from a server. In addition, certain data may be conditioned in one or more ways before it is stored or used, so that personally identifiable information is removed. For example, a user's identity may be conditioned so that no personally identifiable information can be determined for the user, or a user's geographic location may be generalized if location information is obtained (such as to a city, ZIP code, or state level), so that a particular location of a user cannot be determined. Thus, the user may have control over what information is collected about the user, how that information is used, and what information is provided to the user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

In one aspect, advertisement server 102 may include one or more computing devices, configured to perform one or more operations consistent with disclosed embodiments. In one aspect, advertisement server 102 may include one or more servers or server systems. advertisement server 102 may include one or more processors 120 configured to execute software instructions stored in a memory 118 or other storage device. The one or more processors 120 may be configured to execute software instructions that, when executed by a processor, perform internet-related communication, image processing, data processing, and machine learning. Advertisement server 102 may be configured to collect, store and analyze data.

The term "server" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, a touch screen, and other known display devices for displaying information to the user. Display device can display touchable or selectable options for the user to select and may receive user selection of options through a touch screen. Other kinds of devices can be used to provide for interaction with a user as well; for example, various input/output devices, such as a keyboard, a mouse-type device, a gesture sensor, an action sensor, a physical button, switch, microphone, touchscreen panel, stylus, etc.

When a user interface includes a touchscreen, such a user input might include, but is not limited to, a "swiping" motion of a manipulator in a particular direction (e.g., up, down, left, right, to effect a panning motion) along the touchscreen, a "pinching" or "spreading" motion of multiple manipulators (e.g., two fingers) on the touchscreen to effect zooming in or out on the timeline (i.e., increasing or decreasing the spatial zoom level), a gestural input on the touchscreen (e.g., the movement of a manipulator in a particular geometrical pattern), one or more tapping inputs of a manipulator on the touchscreen, and so on. When the user interface includes a cursor control device and a display device, such a user input might include, but is not limited to, a movement of the cursor control device, a click of a cursor control device button, a button click and drag of a cursor control device, and so on.

Feedback provided to the user can be any form of sensory feedback, e.g., visual feedback, auditory feedback, or tactile feedback; and input from the user can be received in any form, including acoustic, speech, or tactile input. In addition, a computer can interact with a user by sending data to and receiving data from a device that is used by the user; for example, by sending web pages, images, etc. to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer implemented method for displaying shoppable advertisements based on a search query, the method comprising:
receiving, by a server, the search query from a user;
retrieving, by the server from an image database, an image related to the search query and comprising displays associated with a plurality of purchasable products from among a plurality of images stored in the image database;
calculating a product relevance score for each of the plurality of purchasable products associated with the retrieved image based on the search query;
ranking each of the plurality of purchasable products based on the product relevance score;
selecting a subset of purchasable products based on the ranking;
displaying the retrieved image on a user device; and
displaying the shoppable advertisements for the selected subset of purchasable products on the user device, wherein the shoppable advertisements are displayed at one or more locations corresponding to the displays associated with the selected subset of purchasable products in the displayed image.

2. The method of claim 1 further comprising calculating a prominence score for the plurality of purchasable products.

3. The method of claim 1 further comprising using machine learning to calculate the product relevance score.

4. The method of claim 3 further comprising calculating the product relevance score for each of the plurality of purchasable products based on one or more of user data, image data, merchant data, and product data.

5. The method of claim 1 wherein displaying the retrieved image further comprises displaying text and a toggle button.

6. The method of claim 5 wherein displaying the shoppable advertisements further comprises displaying indicators anchored to the one or more locations corresponding to the displays associated with the selected subset of purchasable products or offer bubbles anchored to the one or more locations corresponding to the displays associated with the selected subset of purchasable products.

7. The method of claim 6 wherein the offer bubbles are displayed when the toggle button is on and the indicators are displayed when the toggle button is off.

8. The method of claim 5 further comprising directing the user to a particular product category within a merchant website upon the user's interaction with the displayed text.

9. The method of claim 1 further comprising directing the user to a particular product category within a merchant website upon the user's interaction with the displayed image.

10. The method of claim 1 further comprising directing the user to a product page within a merchant website upon the user's interaction with one of the selected subset of purchasable products.

11. The method of claim 6 wherein the offer bubbles further comprise one or more of: a product name, a product price, and an annotation for the selected subset of purchasable products.

12. A system for displaying shoppable advertisements based on a search query, the system comprising:
one or more memory devices storing instructions; and
one or more processors in communication with one or more databases configured to execute the instructions to:

receive the search query from a user;

retrieve, from an image database, an image related to the search query and comprising displays associated with a plurality of purchasable products from among a plurality of images stored in the image database;

calculate a product relevance score for each of the plurality of purchasable products associated with the retrieved image based on the search query;

rank each of the plurality of purchasable products based on the product relevance score;

select a subset of purchasable products based on the ranking;

display the retrieved image on a user device; and display the shoppable advertisements for the subset of purchasable products on the user device, wherein the shoppable advertisements are displayed at one or more locations corresponding to the displays associated with the selected subset of purchasable products in the displayed image.

13. The system of claim 12 wherein the one or more processors are further configured to calculate a prominence score for the plurality of purchasable products.

14. The system of claim 13 wherein the one or more processors are further configured to use machine learning to calculate the product relevance score.

15. The system of claim 14 wherein the one or more processors are further configured to calculate the product relevance score for each of the plurality of purchasable products based on one or more of user data, image data, merchant data, and product data.

16. The system of claim 13 wherein the display of the retrieved image further comprises displaying text and a toggle button.

17. The system of claim 16 wherein the display of the shoppable advertisements further comprises displaying indicators anchored to the one or more locations corresponding to the displays associated with the selected subset of purchasable products or offer bubbles anchored to the one or more locations corresponding to the displays associated with the selected subset of purchasable products.

18. The system of claim 17 wherein the offer bubbles are displayed when the toggle button is on and the indicators are displayed when the toggle button is off.

19. The system of claim 16 wherein the one or more processors are further configured to direct the user to a merchant website upon the user's interaction with the displayed text.

20. The system of claim 13 wherein the one or more processors are further configured to direct the user to a particular product category within a merchant website upon the user's interaction with the displayed image.

21. The system of claim 13 wherein the one or more processors are further configured to direct the user to a product page within a merchant website upon the user's interaction with one of the selected subset of purchasable products.

22. The system of claim 17 wherein the offer bubbles further comprise one or more of a product name, a product price, and an annotation for the selected subset of purchasable products.

23. The method of claim 1, wherein retrieving the image related to the search query from the database includes retrieving, from an association database, embedded information identifying the plurality of purchasable products, and wherein calculating the product relevance score for each of the plurality of purchasable product utilizes the embedded information.

24. The system of claim 12, wherein the one or more processors are further configured to retrieve, from an association database, information embedded in the image which identifies the plurality of purchasable products, and to calculate the product relevance score for each of the plurality of purchasable product utilizing the embedded information.

* * * * *